(12) United States Patent
Kerbs

(10) Patent No.: US 8,771,393 B1
(45) Date of Patent: Jul. 8, 2014

(54) INTEGRATED POLAR CAP FOR A VACUUM WASTE TANK SYSTEM

(75) Inventor: Bradley Jason Kerbs, Salt Lake City, UT (US)

(73) Assignee: Exelis, Inc., McLean, VA (US)

( * ) Notice: Subject to any disclaimer, the term of this patent is extended or adjusted under 35 U.S.C. 154(b) by 162 days.

(21) Appl. No.: 13/454,661

(22) Filed: Apr. 24, 2012

Related U.S. Application Data

(60) Provisional application No. 61/528,373, filed on Aug. 29, 2011.

(51) Int. Cl.
*B01D 50/00* (2006.01)
*B01D 59/50* (2006.01)

(52) U.S. Cl.
USPC ............... 55/385.4; 55/466; 55/522; 55/524; 96/135

(58) Field of Classification Search
USPC .............................. 55/466, 522, 524; 96/135
See application file for complete search history.

(56) References Cited

U.S. PATENT DOCUMENTS

| | | | |
|---|---|---|---|
| 5,002,592 A | 3/1991 | Stroby et al. | |
| 5,197,515 A | 3/1993 | Saville et al. | |
| 5,466,344 A | 11/1995 | Lindke | |
| 5,538,546 A | 7/1996 | Ashton et al. | |
| 5,608,945 A * | 3/1997 | Crouser et al. | 15/328 |
| 6,156,192 A | 12/2000 | Rummler | |
| 6,206,943 B1 | 3/2001 | Friesen et al. | |
| 6,681,412 B2 * | 1/2004 | Doss et al. | 4/431 |
| 7,998,250 B2 | 8/2011 | Pondelick et al. | |
| 7,998,251 B2 | 8/2011 | Pondelick et al. | |
| 2005/0166983 A1 | 8/2005 | Shaw et al. | |
| 2010/0012557 A1 | 1/2010 | Chaffee | |

FOREIGN PATENT DOCUMENTS

JP    2007/289638    11/2007

* cited by examiner

*Primary Examiner* — Jason M Greene
*Assistant Examiner* — Karla Hawkins
(74) *Attorney, Agent, or Firm* — Thorpe North & Western LLP

(57) ABSTRACT

A polar cap for a vacuum waste tank includes an annulus with a lower outer mounting flange and an upper inner mounting flange surrounding a separator opening configured to be coupled to a separator; an inlet opening disposed in the annulus configured to be coupled to a waste line; and another opening disposed in the annulus configured to be coupled to a sensor or a rinse nozzle. The cap can carry sensors, rinse nozzles, inlets, and diverts.

17 Claims, 3 Drawing Sheets

INTEGRATED POLAR CAP FOR A VACUUM WASTE TANK SYSTEM

PRIORITY CLAIM

Priority is claimed to U.S. Provisional Patent Application Ser. No. 61/528,373, filed on Aug. 29, 2011; and which is herein incorporated by reference.

BACKGROUND

1. Field of the Invention

The present invention relates generally to vacuum waste tanks. More particularly, the present invention relates to a polar cap for vacuum waste tank of an aircraft waste system that carries a separator, an inlet, a diverter, a sensor and/or a rinse nozzle.

2. Related Art

As typically know to most travelers, flushing an aircraft toilet results in the waste fluids and solids being "sucked" from the toilet bowl into a tank via a drain pipe. This fundamental process provides a system that is relatively simple, low in weight, and low in odor in comparison to other systems, like a re-circulating toilet used in older aircraft. The principles of this system are based on the pressure differential between the cabin pressure inside the aircraft and the lower air pressure outside of the aircraft at flight altitude. When a patron flushes a toilet, a valve opens to the outside air creating a decrease in pressure or "vacuum" on the sewage waste system in comparison to the cabin pressure. This vacuum pulls the waste fluids and solids from the toilet bowl, through a drain line, and into a holding tank. When the aircraft is on the ground or at lower flight altitudes where this differential of pressures is less than optimal, a vacuum blower is used to boost the differential pressure to the necessary level for the waste system to function correctly.

The fundamental parts of this system include a toilet bowl, a drain line to the holding tank, the holding (waste) tank, and vacuum lines connecting the waste tank to the vacuum blower and the atmosphere outside the aircraft. The waste tank is a simple vacuum vessel used to retain the waste fluids and solids flushed down the toilet until the time the aircraft has landed and tank can be drained. The tank can include sensors, waste inlets and diverts, rinse system, drain, and air-water separator.

The sensors detect the level of the waste inside the tank determining how full the tank is. The sensors are mounted at a certain height along the inner face of the tank wall. They function by contacting the waste fluids and solids and creating an electronic signal. When the tank is full, the sensors will shut down power to the restrooms connected to it.

The waste inlets and diverts connect the drain line from the toilets to the waste tank. The inlets support the waste system in such a way that the vacuum pressure in the tank draws the waste matter from the toilet, through the drain pipe, through the inlets, and into the tank. The ends of the inlets have a profile that fastens or clamps to the drain pipes in such a way that the connection can be easily removed. This interface provides a water-tight seal with the use of an o-ring or gasket to prevent leakage of fluids and solid waste. The diverts work in conjunction with the inlets of the tank and are aligned with the inlets on the inside of the tank. The diverts work to direct the flow of the waste matter that comes into the tank away from the sensors and reduce the splash of matter as it enters the tank. The intent of the diverts is to reduce coating the sensor faces with a buildup of waste fluids and solids that can result in the sensors giving a false reading of a full tank and minimize the amount of fluids and solids impacting the air-water separator.

Rinse systems are installed into the waste tank in which clean water can be sprayed through the rinse system to clean out the inside of the waste tank during servicing. One of the primary aspects of the rinse system is to remove the liquid and solid waste buildup from the face of the sensors in order to ensure the sensors are providing accurate readings of the waste level in the tank.

The drain allows the waste material to be easily removed from the vacuum waste tank while the aircraft is being serviced. Service personnel open a valve in the bottom of the aircraft allowing the waste matter to drain out of the waste tank, through a drain line, and out of the aircraft.

The air-water separator, which typically sits at the top of the waste tank, connects the tank to the vacuum lines that run to the vacuum blower and the exterior of the aircraft. The separator filters out liquid and solid particulates entrained in the air flow which is generated by vacuum from the external pressure differential or the vacuum blower. The separator filters out liquid and solid particulates though the use of baffles and a filtering mesh which is typically assembled in a replaceable filter canister. Depending on the design of the separator, the filter canister can sit fully inside the tank, partially inside the tank, or external of the tank.

The current waste tank systems have several shortcomings in their designs. First, the sensors, rinse systems, and inlets/diverts require penetrations through the tank wall. This reduces the strength and structural integrity of the tank. Second, the mounting fittings that attach these items to the tank require well trained technicians, specialized equipment, and a large amount of time to repair and replace the fittings. Third, the penetrations in the tank and the incorporation of the fittings provide potential leak paths for fluids and solid waste to escape the vacuum waste system which becomes a biohazard. Lastly, the fittings limit the flexibility of the tank size and shape. A new tank design with a slight variation in size or shape would require new fittings and thus expensive molding tools.

SUMMARY OF THE INVENTION

It has been recognized that it would be advantageous to develop a waste tank and/or polar cap thereof that allows the tank, the cap, the separator, the sensor, the rinse nozzle, etc. to be serviced with less specialized equipment and personnel, and in a faster manner. In addition it has been recognized that it would be advantageous to develop a waste tank and/or polar cap that reduces or eliminates the penetrations through the tank wall. Furthermore, it has been recognized that it would be advantageous to develop a waste tank and/or polar cap that would allow interchangeability of components regardless of the size or shape of the tank.

The invention provides a cap for a vacuum waste tank including an annulus with a lower outer mounting flange configured to be mounted to the vacuum waste tank, and an upper inner mounting flange surrounding a separator opening configured to be coupled to a separator. An inlet opening is disposed in the annulus configured to be coupled to a waste line. Another opening is disposed in the annulus configured to be coupled to a sensor or a rinse nozzle.

In accordance with a more detailed aspect of the invention, the annulus can include a frusto-conical shell or a frusto-dome shell. The annulus can further include a diverter coupled to the inlet opening on an interior of the annulus with the annulus and carried by the annulus.

In addition, the invention provides a vacuum waste tank including a tank having an open top. A cap is removably secured to the tank and removably covers the open top of the tank. A plurality of openings is formed in the cap, including a separator opening, an inlet opening, a sensor opening, and a rinse nozzle opening. A separator is carried by the cap and is coupled to the cap at the separator opening. A waste line is coupled to the inlet opening of the cap. A sensor is carried by the cap and is coupled to the cap at the sensor opening. A rinse nozzle is carried by the cap and is coupled to the cap at the rinse nozzle opening.

In accordance with a more detailed aspect of the invention, an outer diameter of the cap can be less than an outer diameter of the tank. The open top of the tank can be formed in an upper dome of the tank. A lateral side of the tank and an upper portion of the tank outside of the cap can be free of openings with couplings thereto. The cap can include a frusto-conical shell or a frusto-dome shell. The cap can include a diverter coupled to the inlet opening on an interior of the cap.

Furthermore, the invention provides a method for servicing a vacuum waste tank, comprising:
  releasing a tank and a cap secured together to form the vacuum waste tank, the cap carrying a separator coupled to a vacuum source, a sensor and a rinse nozzle, and the cap having a waste inlet coupled a waste pipe;
  separating the tank with respect to the cap;
  servicing the tank, the cap, the separator, the sensor, the rinse nozzle, or combinations thereof; and
  rejoining and securing the tank and the cap, or securing a different tank with the cap, or securing a different cap with the tank.

In accordance with a more detailed aspect of the invention, securing the different tank with the cap can include securing a different tank with a different size, a different shape, or both. Releasing the tank and the cap can include releasing a lower outer mounting flange of the cap from a mounting flange around an open top of the tank. An outer diameter of the lower outer mounting flange of the cap can be less than an outer diameter of the tank. An open top of the tank can be formed in an upper dome of the tank. The cap can include a frusto-conical shell or a frusto-dome shell. A diverter can be coupled to the inlet opening of the cap on an interior of the cap. A lateral side of the tank and an upper portion of the tank outside of the cap can be free of openings with couplings thereto.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

The invention provides a vacuum waste tank and a polar cap thereof that can be easily removed from one another. The polar cap can carry most or all of the connections to the vacuum waste tank, including a separator, waste inlet(s), divert(s), sensor(s), and a rinse system/nozzle(s). Such a configuration allows easy removal and replacement of the polar cap and its integrated fittings and components for the waste inlets, diverts, sensors, and rinse system. A damaged fitting can easily be replaced by simply removing the polar cap assembly and replacing it in a matter of minutes. This task can be performed by standard aircraft personnel and does not require a specialist. In addition, this can be performed without the tank needing to be removed from the aircraft. Such a configuration also reduces or eliminates penetrations through the tank wall to support the components, because the components are relocated from the tank wall to the polar cap. By removing the penetrations from the tank wall, the strength and structural integrity of the waste tank is improved. This also reduces the potential for leak paths through the tank wall at these connections. Such a configuration also allows variability of the tank size and shape. This concept provides a universal cap which does not hinder in any way the size and shape of the waste tank. Thus, multiple tanks can use the same polar cap without requiring additional fittings.

Figure 1:
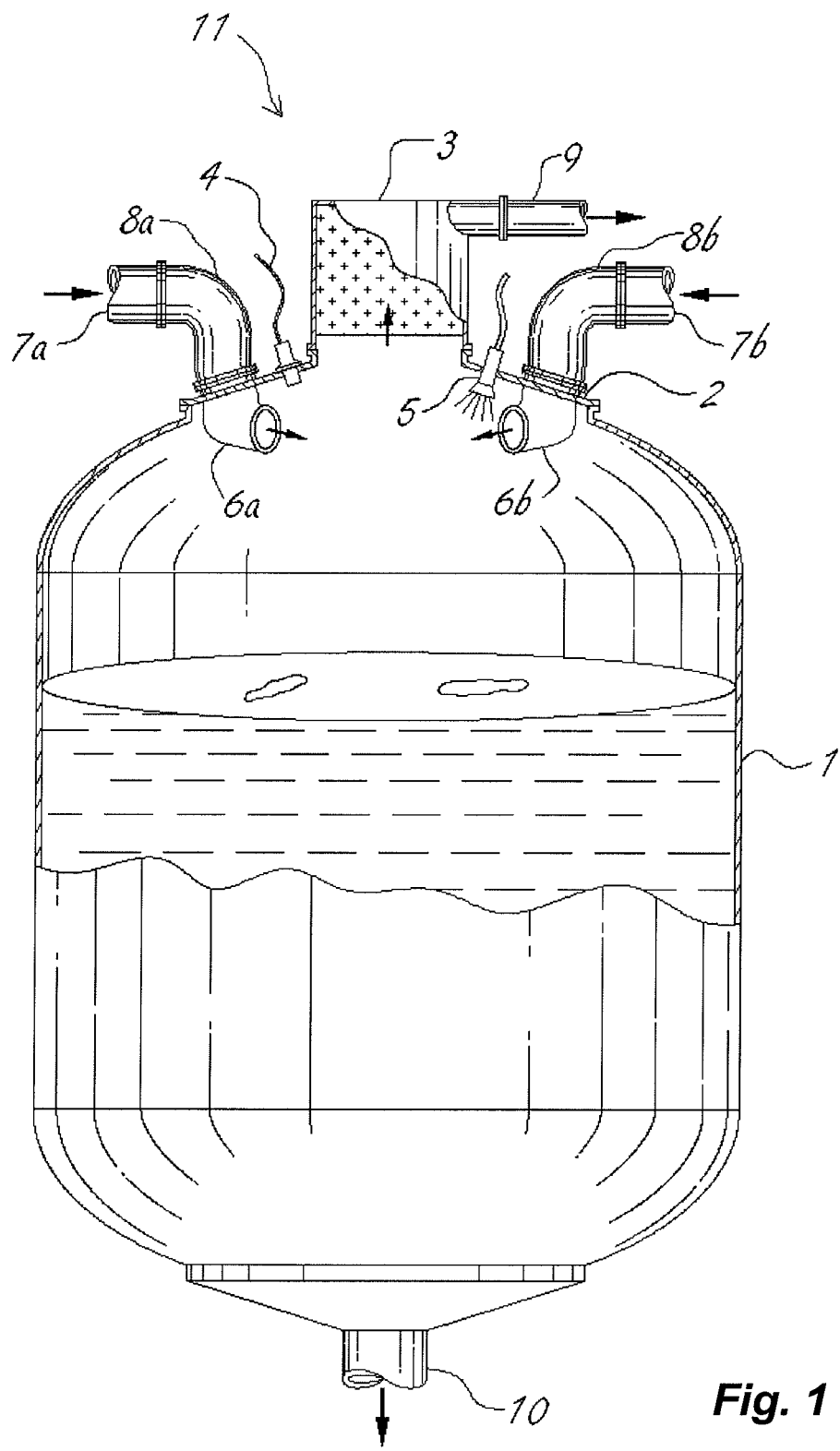
FIG. 1 is a partially broken away side schematic view of a waste tank and polar cap in accordance with an embodiment of the present invention, shown coupled to waste lines, a separator, a vacuum line, a sensor, and a rinse nozzle.
Figure 2:
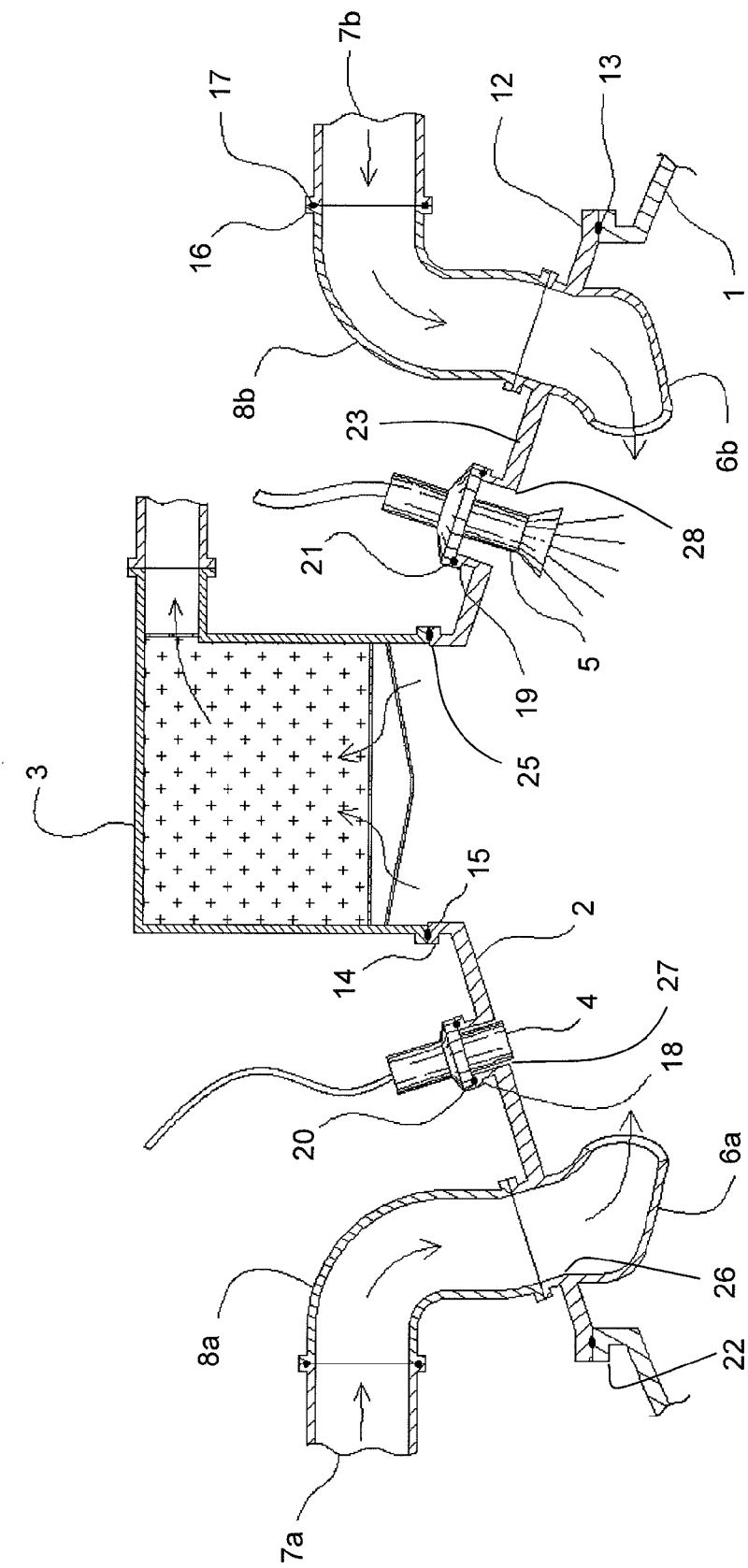
FIG. 2 is a partially broken away side schematic view showing a top of the waste tank and polar cap of FIG. 1.
Figure 3:
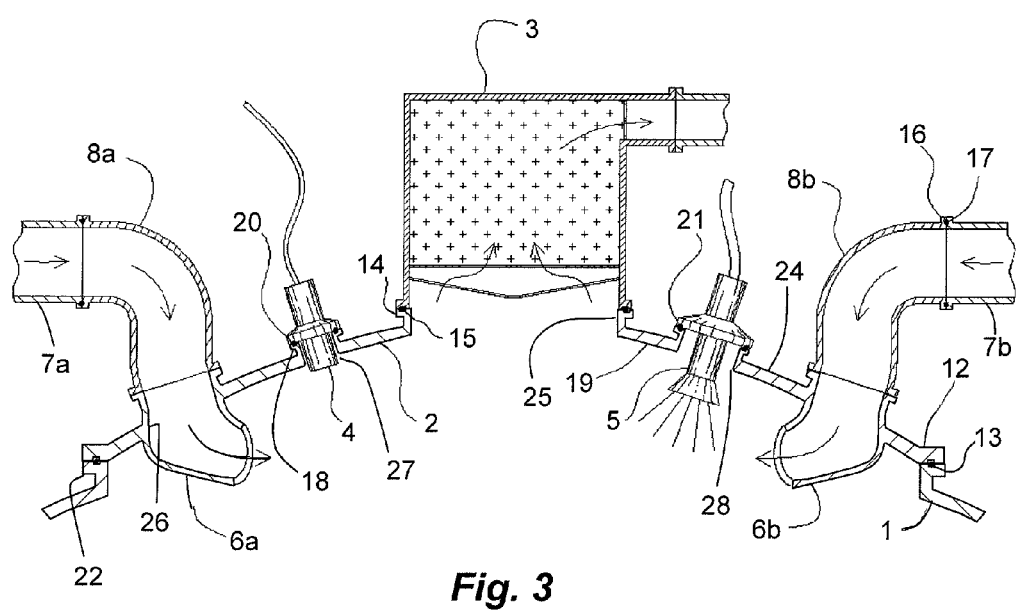
FIG. 3 is a partially broken away side schematic view showing a top of the waste tank and polar cap in accordance with another aspect of the present invention.

As illustrated in FIGS. 1-3, a vacuum waste tank 1 with an integrated polar cap 2 in an example implementation in accordance with the invention is shown as part of a vacuum waste system 11. The waste system includes waste lines 7a and 7b extending from a waste source, such as toilets, and a vacuum line(s) 9 extending to a blower or low pressure source. The waste system, and/or the waste tank, includes inlets 8a and 8b from the waste lines, diverts or diverters 6a and 6b coupled at the inlets, a sensor(s) 4, a rinse nozzle(s) 5, and a separator 3. When a toilet in the main cabin of the aircraft is flushed, the waste is drawn from the toilet, through the drain or waste lines 7a and 7b, through the inlets 8a and 8b, and is distributed into the waste tank 1 by the diverts 6a and 6b. The waste matter stored in the waste tank 1 is later disposed of or drained out through the drain 10 during servicing of the aircraft. The vacuum airflow used to suck the waste through the system 11 is pulled from the tank 1 through the separator 3. The separator 3 removes liquid and solid waste matter that is entrained in the airflow. The cleaned air then passes through the vacuum line 9 to the vacuum blower and/or the exterior of the aircraft.

The tank 1 can have a vertically oriented cylindrical shape capped by hemispherical domes to form an enclosure to contain the waste. The drain 10 can be formed in the bottom or lower hemisphere or dome. The remaining lateral sides, upper portion or dome outside the cap, and lower portion or dome outside the drain can be free of openings with couplings thereto, or openings therethrough, as described in greater detail below. The elimination of openings in the tank, outside the cap and drain, can improve strength and structural integrity of the tank, reduce potential leak paths, and facilitate removal and replacement of the tank. The tank can be formed of composite material, such as fibers in a resin matrix, and can be formed by filament winding. The tank can have an open top, or an opening in the top, which is covered by the cap to form the tank or enclosure. The opening can be formed in the upper dome, and can have a diameter less than a diameter of the tank, or cylindrical portion thereof. Thus, the opening is smaller than the tank, as opposed to coextensive or the same as the tank. A mounting flange 14 can be formed around the top opening, and can extend radially outwardly therefrom.

The polar cap 2 can be removably coupled to the tank 1 and can removably cover the top opening or open top of the tank. The polar cap 2 can have or can be an annulus. The terms cap and annulus are used interchangeably herein. The cap or annulus can have a lower outer mounting flange 12 removably attached to the mounting flange 22 of the tank with a clamp or fasteners. This connection can be sealed to be air-tight with the use of a gasket or o-ring 13. This connection is made such that the polar cap 2 or annulus can be disassembled from the waste tank 1 easily by removing the securing clamp or fasteners, and then lifting the polar cap 2 upward off of the waste tank 1. The outer diameter of the cap 2 or flange 12 can be less than the outer diameter of the tank, or cylindrical portion thereof. In addition, the cap or annulus can have an upper inner mounting flange 14 removably mounted to the separator 3, or mounting flange thereof, using a clamp or fasteners. Likewise, this connection can be sealed using a gasket or o-ring 15. This connection is such that the separator 3 can be disassembled from the polar cap 2 by removing the securing clamp or fasteners, and then lifting the separator 3 upward off of the polar cap 2. Depending on the design of the separator 3, part or all of the separator 3 can set recessed into the polar cap 2.

The polar cap 2 or annulus can have a flat, domed (FIG. 3), or conical (FIG. 2) shape to support the loading caused by the difference of pressure from the inside of the tank versus the outside of the tank. The polar cap or annulus can have or can be a frusto-conical shell 23 (FIG. 2) or a frusto-dome shell (or frusto-sphere shell) 24 (FIG. 3). The frusto-conical shell 23 can be a conical frustum shell that is a frustum created by slicing the top off a cone (with the cut made parallel to the base). The frusto-dome shell 24 can be a spherical segment or dome frustum defined by cutting a sphere with a pair of parallel planes. It can be thought of as a spherical cap with the top truncated, and so it corresponds to a spherical frustum. The polar cap or annulas can also be formed of a composite material.

In addition, the polar cap 2 or annulus can have a plurality of connections or openings to mount the separator 3, the sensor(s) 4, the waste inlet(s) 8a and 8b, the divert(s) 6a and 6b, and the rinse nozzle(s) 5. The cap or annulus can have a central opening or center of the annulus, defining a separator opening 25. The separator 3 can be coupled to the cap or annulus at the separator opening, and coupled to and carried by the cap or annulus. An upper inner flange 14 can circumscribe the central opening or separator opening 25 to facilitate mounting the separator to the cap or annular at the opening.

The cap or annulus can have one or more inlet openings 26 or waste inlets 8a and 8b. The waste lines 7a and 7b can be coupled to the inlet openings or waste inlets of the cap or annulus. The inlet openings 26 and waste inlets 8a and 8b can be coupled to and carried by the cap or annulus. Similarly, one or more diverts or diverters 6a and 6b can be coupled to the inlet openings 26 or waste inlets 8a and 8b on an interior of the cap or annulus, and thus an interior of the tank. The diverts or diverters can be coupled to and carried by the cap or annulus. The inlets and diverts can be either mounted to the cap using clamps or fasteners or can be integrally built into the cap. The inlets 8a and 8b can have a tubular profile to support the flow of the waste fluids and solids from the drain lines 7a and 7b, passing through the polar cap 2 or annulus at the inlets 8a and 8b, and into the waste tank 1 via the diverts 6a and 6b. The inlets 8a and 8b can have a mounting flange 16 that can clamp to the drain lines 7a and 7b, and can be sealed using a gaskets or o-rings 17. The inlets 8a and 8b can be attached to the polar cap 2 or annulus using clamps or fasteners, or they can be integrally welded, molded, or bonded to the polar cap. The diverts 6a and 6b pass the waste fluids and solids from the inlets 8a and 8b into the waste tank 1 using a tubular, elbow-shaped profile to direct the flow away from the sensors 4. The diverts can be attached to the polar cap 2 or annulus using clamps or fasteners, or can be integrally welded, molded, or bonded to the polar cap. Thus, the diverts or diverters can be integrally formed with the cap.

The polar cap 2 or annulus has penetrations that allow the sensor(s) 4 and rinse nozzle(s) 5 to protrude to the inner wall of the polar cap or annulus, and be removable from the exterior without the polar cap or annulus needing to be disassembled from the waste tank. The penetrations can be supported with mounting flanges 18 and 19, in which the sensor(s) 4 and the rinse nozzle(s) 5 can be assembled using fasteners or clamps, and sealed with gaskets or o-rings 20 and 21. Thus, the cap or annulus can further include a sensor opening 27 and a rinse nozzle opening 28. The sensor 4 can be coupled to the cap or annulus at the sensor opening 27; and the rinse nozzle 5 can be coupled to the cap or annulus at the rinse nozzle opening 28. The sensor 4 can be coupled to and carried by the cap or annulus; and the rinse nozzle 5 can be coupled to and carried by the cap or annulus. In one aspect, the cap or annulus can have at least three openings, including the center of the annulus or separator opening 25 to which the separator 3 is coupled; the inlet opening 26 or waste inlet to which the waste line is coupled; and another opening, such as the sensor opening 27 or the rinse nozzle opening 228. In another aspect, the cap or annular can have at least three openings, including the center of the annulus or separator opening 25, the inlet opening 26 or waste inlet, the sensor opening 27, and the rinse nozzle opening 28. The sensors can be mounted to the polar cap using clamps or fasteners in such a way that they can be easily removed for repair or replacement.

The cap 2 or annulus can also have a lower outer mounting flange 12 that can circumscribe the cap or annulus at a lower edge thereof to mount the cap or annulus to the flange 22 of the waste tank 1. The inlet openings 26 or waste inlets 8a and 8b, the sensor opening 27 and the rinse nozzle opening 28 can be formed in the annulus between the lower outer mounting flange 12 and the inner upper mounting flange 14.

Thus, the invention involves a polar cap 2 for use with a waste tank 1, with respect to a vacuum waste tank of an aircraft. The polar cap 2 or annulus can be a ring that secures to the top of the tank 1 (and forms the top of the tank) and carries all, some or a combination, of the connections for the separator 3, the sensor(s) 4, the inlets 8a and 8b, the diverts 6a and 6b, and the rinse nozzle(s) 5. Thus, the polar cap 2 or annulus can be easily removed from the tank. The polar cap 2 or annulus has a bottom that couples to the top of the tank, and a top that couples to the separator 3 using clamps or fasteners. The polar cap can be annular with an outer diameter less than an outer diameter of the tank, and an inner diameter to mate or match the separator. The polar cap 2 can carry the integrated fittings and components. Thus, a damaged fitting can be easily replaced by removing the polar cap assembly and replacing it by standard aircraft personnel and without removing the tank. In addition, the fittings and components are moved from the tank wall to the polar cap, improving the strength and structural integrity of the tank. Thus, a lateral side of the tank and an upper portion of the tank outside of the cap are free of openings with couplings thereto. Furthermore, the polar cap allows for variable sized and shaped tanks, and provides a universal cap.

Aircraft toilets can have the waste fluids and solids sucked from the toilet bowl and into the tank. At altitude, the lower pressure outside the aircraft is opened to the tank, pulling the waste into the tank. At lower altitudes and on the ground, a vacuum blower is used. The waste tank is simply a vacuum vessel used to retain the waste fluids and solids, while the air is drawn from the tank. An air-water separator can sit atop the waste tank to filter out liquid and solid particles entrained in the airflow to resist particulates and moisture in piping and equipment downstream from the tank. Waste inlets and diverts connect the drain line from the toilets to the waste tank. Sensors are coupled to the tank to detect the level of waste in the tank. A rinse system is installed into the waste tank to spray water and clean the tank and sensors. Many of these components penetrate through the tank wall, reducing strength and structural integrity, providing potential leaks, and requiring trained technicians to repair and replace fittings.

The polar cap and waste tank design of the present invention can be used with general commercial and military aircraft vacuum waste systems; special mission aircraft in which the tailoring of the size and shape of the waste tank is critical; a commercial or residential toilet system in which the "greener", low-water consumption is preferred; and a recreational vehicle (RV) waste system that requires storage of waste and low-water consumption.

A method for using the polar cap and waste tank described above, and for servicing a vacuum waste tank, includes:

releasing a tank 1 and a cap 2 secured together to form the vacuum waste tank, the cap carrying a separator 3 coupled to a vacuum source or vacuum line 9, a sensor 4 and a rinse nozzle 5, and the cap having a waste inlet 8a or 8b coupled a waste pipe or line 7a or 7b;

separating the tank with respect to the cap;

servicing the tank, the cap, the separator, the sensor, the rinse nozzle, or combinations thereof; and 1) rejoining and securing the tank and the cap, or 2) securing a different tank with the cap, or 3) securing a different cap with the tank. The different tank can have a different size, a different shape, or both. Thus, the tank can be replaced with a similar tank, or a different tank, while maintaining the same tank operating system. Releasing the tank and the cap can include releasing a lower outer mounting flange of the cap from a mounting flange around an open top of the tank.

Although the tank and cap have been described above and shown in the drawings with the tank having a larger diameter than the cap, the cap and tank can have the same outer diameter, so that the cap is substantially the same diameter as the tank.

The various components can coexist when attached to the cap. For example, the rinse nozzle can be integrated into the separator using a single connection to the cap.

Various aspects of waste tanks are found in U.S. Pat. Nos. 5,211,337 and 6,206,943; and U.S. patent application Ser. No. 13/344,199, filed Jan. 5, 2012; which are herein incorporated by reference.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A cap device for a vacuum waste tank, the device comprising:
   a) an annulus having a lower outer mounting flange removably mounted to a mounting flange of the vacuum waste tank, and an upper inner mounting flange surrounding a separator opening configured to be coupled to a separator, with a diameter of the mounting flange of the waste tank, and an outer diameter of the lower outer mounting flange of the annulus, both being less than an outer diameter of the tank;
   b) an inlet opening disposed in the annulus configured to be coupled to a waste line; and
   c) another opening disposed in the annulus configured to be coupled to a sensor or a rinse nozzle.

2. A device in accordance with claim 1, wherein the annulus includes a frusto-conical shell or a frusto-dome shell.

3. A device in accordance with claim 1, further comprising at least three openings in the annulus, including:
   a) the separator opening configured to be coupled to the separator;
   b) the inlet opening configured to the coupled to the waste line; and
   c) the another opening.

4. A device in accordance with claim 1, further comprising at least four openings in the annulus, including:
   a) the separator opening configured to be coupled to the separator;
   b) the inlet opening configured to the coupled to the waste line;
   c) and wherein the another opening includes at least two other openings,
   including one configured to be coupled to the sensor and another configured to be coupled to the rinse nozzle.

5. A device in accordance with claim 1, further comprising:
   a) the separator coupled to the separator opening;
   b) the waste line coupled to the inlet opening; and
   c) the sensor or the rinse nozzle coupled to the another opening.

6. A device in accordance with claim 1, further comprising:
   a diverter coupled to the inlet opening on an interior of the annulus and carried by the annulus.

7. A vacuum waste tank device, comprising:
   a) a tank having an open top with a tank mounting flange having a diameter less than a diameter of the tank;
   b) a cap removably secured to the mounting flange of the tank and removably covering the open top of the tank, and the cap having an outer diameter less than the diameter of the tank;
   c) a plurality of openings formed in the cap, including a separator opening, an inlet opening, a sensor opening, and a rinse nozzle opening;
   d) a separator carried by the cap and coupled to the cap at the separator opening;
   e) a waste line coupled to the inlet opening of the cap;
   f) a sensor carried by the cap and coupled to the cap at the sensor opening; and
   g) a rinse nozzle carried by the cap and coupled to the cap at the rinse nozzle opening.

8. A device in accordance with claim 7, wherein the open top of the tank is formed in an upper dome of the tank.

9. A device in accordance with claim 7, wherein a lateral side of the tank and an upper portion of the tank outside of the cap are free of openings with couplings thereto.

10. A device in accordance with claim 7, wherein the cap includes a frusto-conical shell or a frusto-dome shell.

11. A device in accordance with claim 7, further comprising:
    a diverter coupled to the inlet opening on an interior of the cap.

12. A method for servicing a vacuum waste tank, comprising:

releasing a tank and a cap secured together to form the vacuum waste tank, the cap carrying a separator coupled to a vacuum source, a sensor and a rinse nozzle, and the cap having a waste inlet coupled a waste pipe, and the cap having an outer diameter less than a diameter of the tank;

separating the tank with respect to the cap;

servicing the tank, the cap, the separator, the sensor, the rinse nozzle, or combinations thereof; and rejoining and securing the tank and the cap, or securing a different tank with the cap, or securing a different cap with the tank.

13. A method in accordance with claim 12, wherein securing the different tank with the cap includes securing a different tank with a different size, a different shape, or both.

14. A method in accordance with claim 12, wherein an open top of the tank is formed in an upper dome of the tank.

15. A method in accordance with claim 12, wherein the cap includes a frusto-conical shell or a frusto-dome shell.

16. A method in accordance with claim 12, wherein a diverter is coupled to the inlet opening of the cap on an interior of the cap.

17. A method in accordance with claim 12, wherein a lateral side of the tank and an upper portion of the tank outside of the cap are free of openings with couplings thereto.

* * * * *